United States Patent
Cook

[15] 3,683,707
[45] Aug. 15, 1972

[54] PROPULSION SYSTEM

[72] Inventor: Robert L. Cook, 4729 Olive Dr., Concord, Calif. 94521

[22] Filed: Oct. 30, 1970

[21] Appl. No.: 85,548

Related U.S. Application Data

[63] Continuation-in-part of Ser. No. 813,529, April 4, 1969, abandoned.

[52] U.S. Cl. ................................................... 74/84
[51] Int. Cl. .......................................... F16h 27/04
[58] Field of Search .............................. 74/84 S, 84

[56] References Cited

UNITED STATES PATENTS 3,584,515  6/1971  Matyas ......................... 74/84

*Primary Examiner*—Milton Kaufman
*Attorney*—Joseph B. Gardner

[57] ABSTRACT

A propulsion system operative to propel a vehicle along a linear path. In one form of the invention, a wheel-equipped vehicle is propelled along a linear path by the change in position of the center of gravity of a rotatably driven composite mass or weight which is subdivided into two counterrotating mass members. Each mass member is slidably displaceable along a rotatably driven carrier rotatably supported on the chassis of the vehicle, and the mass member is connected to the chassis through a tension spring. As the carrier rotates, the mass member mounted therein has its center of gravity shifted with respect to the axis of rotation of the carrier such that the center of gravity of the mass member lies almost entirely within one particular predetermined segment of the arcuate path described by the carrier and which segment is generally of the order of 180°.

10 Claims, 5 Drawing Figures

Patented Aug. 15, 1972
3,683,707
2 Sheets-Sheet 1
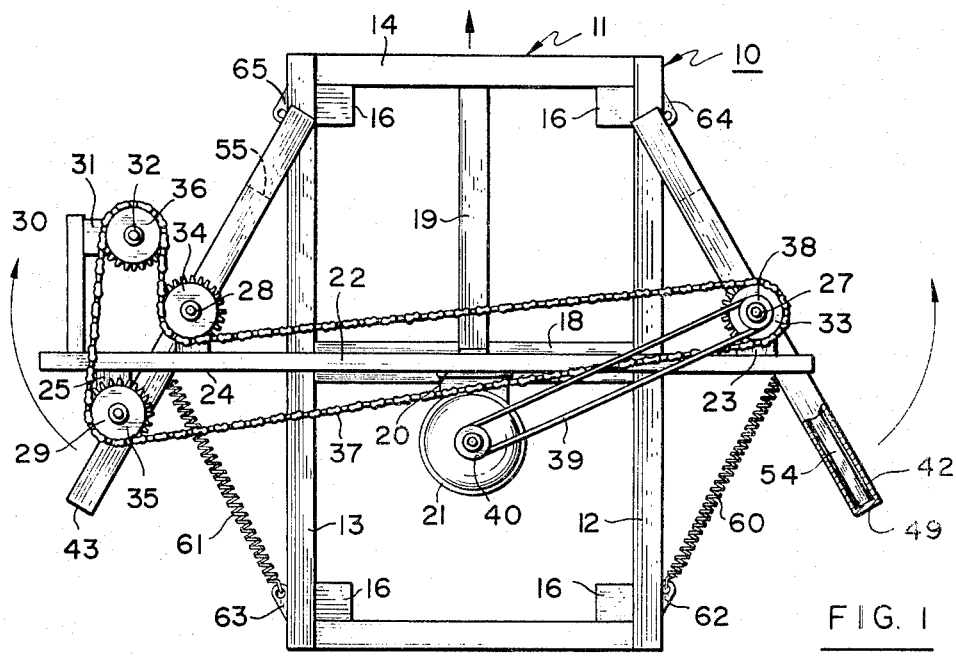
FIG. 1
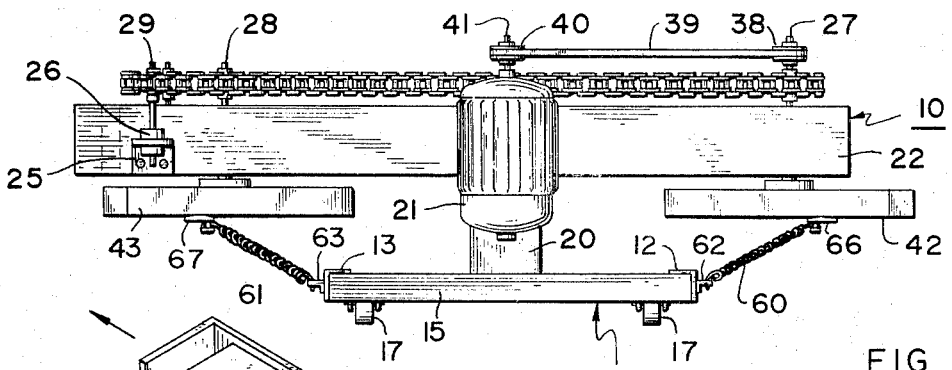
FIG. 2
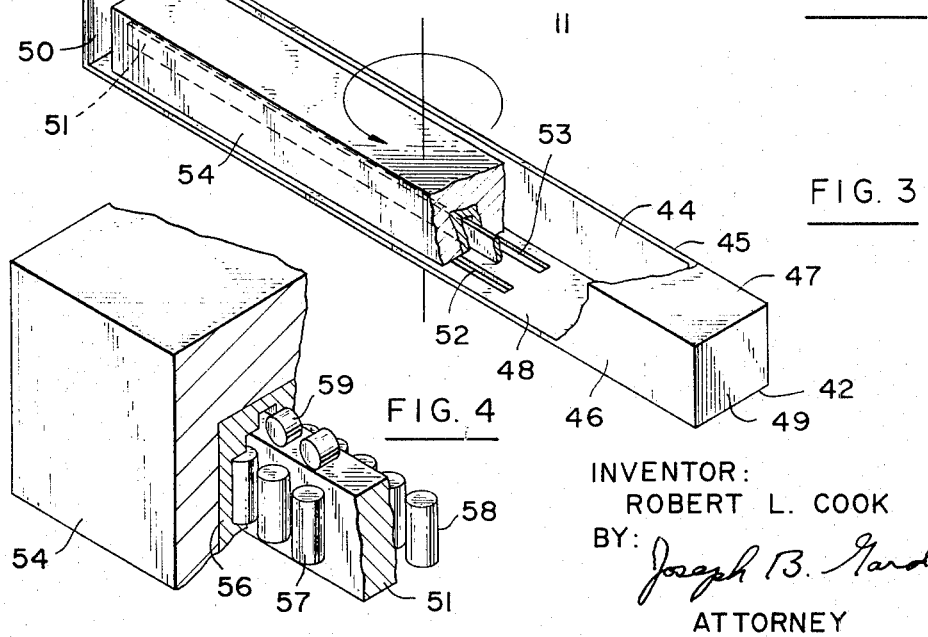
FIG. 3
FIG. 4
INVENTOR:
ROBERT L. COOK
BY: Joseph B. Gardner
ATTORNEY INVENTOR:
ROBERT L. COOK
BY: *Joseph B. Gardner*
ATTORNEY

PROPULSION SYSTEM

RELATED APPLICATION

This application is a continuation-in-part of my copending patent application Ser. No. 813,529, filed Apr. 4, 1969, now abandoned, under the title of APPARATUS FOR CONVERTING ROTARY MOTION TO LINEAR FORCE, which application became abandoned Nov. 3, 1970.

This invention relates to a propulsion system and, more particularly, to apparatus for propelling a vehicle along a linear path by means of a controlled change in position of the center of gravity of a rotatably driven mass or weight. The invention has utility in a number of environments as, for example, in propelling a wheel-equipped vehicle along a ground surface.

The purpose of the present invention is to convert the energy and forces resulting from rotation of a mass member into a linear force which can be used to propel a vehicle in a predetermined linear direction. In effecting this purpose, the center of gravity of a rotating mass is controlled and confined so as to lie predominately along one side of the axis of rotation of the mass and to utilize this controlled location of the center of gravity of the mass to propel a vehicle in a linear direction. In a particular embodiment of the invention, the mass member is slidably supported within a carrier mounted for rotation about a generally vertical axis through the center of the carrier. Such axis of rotation is defined by a shaft or axle supported by the chassis of a vehicle which is equipped with a prime mover operative to rotatably drive the carrier. The maximum positions of the mass member within the carrier are defined by abutment of the mass member selectively with the opposite ends of the carrier, and the mass member is connected with the chassis of the vehicle by a tension spring extending therebetween.

It is believed that the mass member (the composite mass is actually subdivided into two separate mass members which are driven in counterrotation in mechanically enforced synchronism such that the forces respectively attributable thereto are algebraically additive) functions as a body free in space and at least at certain predetermined times in its rotary motion, serves as a space anchor causing the chassis of the vehicle to be propelled forwardly with respect thereto because of the pulling force applied to the chassis via the tension spring connecting the same to the rotating mass.

An embodiment of the invention is illustrated in the accompanying drawing, in which:

FIG. 1 is a top plan view of propulsion apparatus embodying the invention;

FIG. 2 is a rear view in elevation of the apparatus shown in FIG. 1;

FIG. 3 is a perspective view of one of the rotatable carriers with portions thereof broken away to illustrate the mass member slidably carried within the interior thereof;

Figure 5:
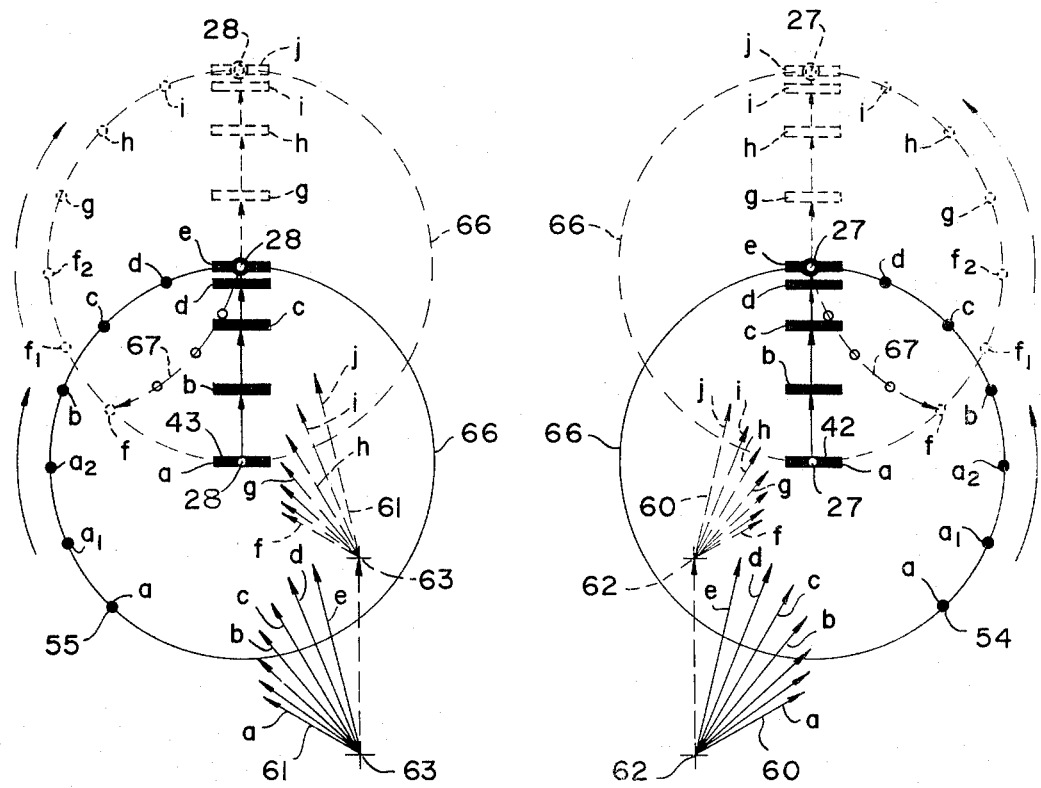

FIG. 4 is an enlarged, broken perspective view illustrating a portion of the mass member supported by one of the carriers and the structural interrelationship therebetween; and FIG. 5 is a diagrammatic view depicting the change in position of the center of gravity of the movable mass member supported within the carrier illustrated in FIG. 3 as the carrier is rotated through an arcuate path of 360°.

The embodiment of the invention shown in the drawing is essentially a wheel-equipped vehicle propelled along a linear path by the change in position of the center of gravity or mass of a composite rotatable mass or weight as it is rotatably driven through an arcuate path or 360°. As will become apparent hereinafter, the composite mass in the embodiment of the invention being considered is subdivided into a plurality of individual mass members which are rotatably driven in opposite angular directions to counterbalance certain of the centrifugal force vectors which otherwise would cause unwanted vibration or undulation of the vehicle in directions transversely disposed with respect to the direction in which the vehicle is traveling. In a manner analogous to the use of multiple piston-cylinder structures in a conventional internal combustion engine for the purpose of reducing vibration, any suitable number of mass members or weights may be used in the apparatus, and the relative angular disposition of the mass members may be predetermined so that they impart propelling force to the vehicle in a sequential arrangement approximating a continuous propelling force being applied thereto.

The vehicle illustrated in FIGS. 1 and 2 is denoted in its entirety with the numeral 10, and it includes a chassis or platform 11 comprising a pair of transversely spaced and longitudinally extending side rails or longitudinal beams 12 and 13, and a pair of longitudinally spaced and transversely extending end or transverse beams 14 and 15. The beams 12, 13, 14 and 15 are all rigidly secured to each other in a generally rectangular configuration, as shown in FIG. 1, and they may be reinforced at the corner portions thereof by a plurality of gussets 16. The gussets 16 provide a mounting means for a plurality of wheels 17 which, in the form shown, are ordinary casters. The components defining the chassis 11 may be rigidly interconnected in any suitable means as, for example, by welding the components one to another. It should be emphasized that the particular apparatus illustrated and described herein is a functional or working prototype that demonstrates the operational principles of the inventions, and larger and more refined versions of the apparatus may have entirely different chassis and wheel configurations and will be equipped with steering mechanism that permits the direction of travel of the apparatus to be changed at the will of the operator. Also, the particular apparatus 10 being considered is designed to be supported upon and traverse ground, road, or floor surfaces, but non-ground supported versions of the apparatus can be constructed utilizing the propulsion techniques and principles described herein.

Extending between the longitudinal beams 12 and 13 at about the midpoint thereof is a support beam 18 that may be welded or otherwise rigidly secured to the longitudinal beams, and the support 18 and structure mounted thereon are rigidified by a strut 19 disposed intermediate the beams 12 and 13 and rigidly secured at its opposite ends to the transverse beam 14 and support 18. Extending upwardly from the support 18 is a mounting plate or bracket 20, and fixedly attached thereto is a prime mover 21 that takes the form of an electric motor. It should be understood, however, that the prime mover 21 may be any other suitable type such as a conventional gasoline engine. The motor 21 may be energized from a DC or AC source, and in particular apparatus being considered, the motor 21 is a 110 volt AC motor energized by connecting the same to an ordinary convenience outlet by the usual plug-equipped conductors, not shown.

Rigidly attached to the bracket 20 adjacent the upper end thereof is a transversely extending support or mounting beam 22 of greater length than the width of the chassis 11 so as to project outwardly beyond the side rails 12 and 13 thereof. The strut 19 may be secured directly to the beam 22, as shown in FIG. 1, with the result that the strut is angularly disposed and extends upwardly and inwardly from the transverse beam 14 toward the center of the chassis. The support beam 22 adjacent the opposite end portions thereof is equipped with generally L-shaped brackets 23, 24, and 25 which respectively carry bearings 26, as indicated most clearly in FIG. 2 by the bracket 25 and bearing 26 carried thereby. The bearing-equipped brackets 23, 24 and 25 have shafts 27, 28 and 29 respectively journaled therein so as to rotate freely about the generally vertical axes defined thereby. In a similar manner, the support beam 22 is provided outwardly from the brackets 24 and 25 with a longitudinally extending support 30 projecting in the direction of the transverse beam 14, and at its outer free end, the support member 30 carries an L-shaped bracket 31 that is equipped with a bearing (not shown) having a shaft 32 journaled for rotation therein. The shaft 32 is also vertically disposed and, accordingly, all of the shafts 27, 28, 29 and 32 are essentially parallel.

A plurality of sprockets 33, 34, 35 and 36 are respectively mounted upon the shafts 27, 28, 29 and 32 and are keyed or otherwise fixedly secured thereto so as to prevent relative rotation therebetween. Entrained about the various sprockets is an endless chain 37 and, as illustrated in FIG. 1, the chain 37 does not confine the sprocket 34 between its two legs or reaches, wherefore the sprockets 33 and 34 rotate in opposite angular directions. The shaft 27 is also equipped with a sheave or pulley wheel 38 having an endless drive belt 39 entrained thereabout which at its opposite end is entrained about a drive sheave 40 that is mounted upon the output shaft 41 of the motor 21. It will be apparent, then, that whenever the motor 21 is energized, it drives the shaft 27 and sprocket 33 mounted thereon whereupon all of the sprockets 34, 35 and 36 are driven via the endless chain 37.

Secured to the shaft 27 and depending therefrom beneath the lower extremity of the support beam 22 is a carrier 42 constrained on the shaft so as to rotate therewith. In an essentially identical manner, a carrier 43 is attached to the shaft 28 and is rotatably driven thereby. It will be apparent by comparing FIGS. 1 and 2 that the carriers 42 and 43 are symmetrically disposed relative to the longitudinal center of the chassis 11 and apparatus 10, and that the carriers are respectively secured at essentially the midpoints or geometric centers thereof to the associated shafts 27 and 28. The carriers 42 and 43 are substantially identical, and as illustrated in FIG. 3 which shows the carrier 42, each carrier is an elongated hollow component which, in the form shown, is generally square-shaped in cross section and defines a substantially closed compartment 44 therewithin bordered by side walls 45 and 46, top and bottom walls 47 and 48, and end walls 49 and 50. Extending upwardly from the bottom wall 48 at the center thereof is a guide rail 51 which projects substantially from end to end of the carrier. The guide rail 51 has a pair or elongated slots 52 and 53 extending along each side thereof which need not be as long as the rail 51 and may terminate, as shown in FIG. 3, a few inches in each direction from the center of the carrier. The carriers 42 and 43 need not be completely closed, and they are not required to have the polygonal configuration shown in cross section and, for example, might be cylindrical.

Respectively mounted within the carriers 42 and 43 are mass members or weights 54 and 55 which may be identical and are supported within the carriers for slidable longitudinal displacements with respect thereto. As illustrated in FIGS. 3 and 4, each of the mass members is generally square-shaped in cross section and substantially fills the hollow interior or compartment 44 within the associated carrier. The mass member is somewhat shorter than the associated carrier so that it can move longitudinally relative thereto from opposite extreme positions in which the mass member is either in contact with the end wall 49 or with the end wall 50 of the associated carrier. By way of a specific instance, in one embodiment of the apparatus 10, the carriers 42 and 43 are approximately 22 inches in length, and the mass members 54 and 55 are each approximately 18 inches in length, thereby providing a difference of 4 inches through which each mass member may be displaced relative to the carrier supporting the same.

It is advantageous to provide as frictionless a support as practicable for the mass members 54 and 55 within their respectively associated carriers 42 and 43 so that energy losses owing to frictional inhibition to movement of the mass members is minimized. Such desirability for frictionless support usually defines the inclusion of bearing structure to relate each mass member to its carrier. The bearing structure employed may take a great variety of forms, and the illustrative instance thereof shown in the drawing includes an elongated, longitudinally extending or linear race 56 confined within an opening provided therefor along the bottom of the mass member, and groups of thrust bearings 57 and 58 and support bearings 59 operative between the race 56 and the guide rail 51, as illustrated most clearly in FIG. 4. The linear bearing structure defined in part by the race 56 is closed at its ends to prevent escape of the bearings, which bearings in the embodiment of the invention being considered are roller bearings.

Slidable movement of the mass members 54 and 55 relative to their respectively associated carriers 42 and 43 is effected in part by springs 60 and 61 the first of which is connected at one of its ends to the mass member 54 and at its opposite end to an ear 62 fastened to the longitudinal beam 13 adjacent an end thereof, and the second of which is connected at one end to the mass member 55 and at its opposite end to an ear 63 carried by the longitudinal beam 12 adjacent its end. The ears 62 and 63 are opposite each other adjacent the transverse beam 15, and a second pair of ears 64 and 65 are respectively carried by the beams 13 and 12 at the opposite ends thereof adjacent the transverse beam 14. The springs 60 and 61 are adapted to be selectively connected with the ears 62, 63 or with the ears 64, 65 depending upon the direction in which the apparatus 10 is intended to be propelled, as is brought out in greater detail hereinafter. The springs 60 and 61 are respectively connected with the mass members 54 and 55 by means of couplings 66 and 67 each of which may have a somewhat U-shaped configuration being connected with the mass member through the slots 52 and 53, and having a swivel or other low friction joint to prevent twisting of the springs as the carriers 42 and 43 rotate.

In operation of the apparatus 10, the wheels 17 thereof are supported upon an appropriate surface that is preferably hard and firm because of the small diameter of the wheels. The electric prime mover 21 is connected with a source of power and when energized, the prime mover rotatably drives the shaft 27 and sprocket 33 mounted thereon in a counterclockwise direction, as indicated by the arrow in FIG. 1. Concurrently therewith, the shaft 28 and sprocket 34 thereon are rotatably driven through the chain 37 in a clockwise direction, as viewed in this same Figure. As a result, the carriers 42 and 43 are driven simultaneously in counterclockwise and clockwise directions, respectively, and they are angularly oriented with respect to each other so that they are counterrotating. Rotational movement of the carriers 42 and 43 causes the mass members 54 and 55 respectively mounted therein to be displaced cyclically between the extreme opposite positions represented by juxtaposition with the opposite ends of the carriers. Displacements between carriers 42 and 43 and the mass members 54 and 55 respectively supported thereby occur at predetermined intervals in the angular displacement of the carriers and impart linear motion to the apparatus 10. With the carriers 42 and 43 rotating in the directions indicated in FIG. 1 and with the springs 60 and 61 connected with the chassis 11 at the ears 62 and 63, the apparatus will be propelled forwardly in the direction of the arrow in FIG. 1. The direction of linear motion imparted to the apparatus 10 can be changed simply by connecting the springs 60 and 61 to the ears 64 and 65 rather than to the ears 62 and 63. Such change in the orientation of the spring force alters the direction of propulsion of the apparatus without the necessity of changing the direction of rotation of the carriers 42 and 43.

It is evident from the foregoing description that the apparatus 10 successively converts the rotary motion of the carriers 42 and 43 and mass members 54 and 55 carried thereby into linear motion causing the apparatus to be propelled in one particular straight line motion. I am not certain as to the principles underlying operation of the apparatus 10, but theorized that the centrifugal force present in the mass members as a result of the rotation imparted thereto by the carriers 42 and 43 causes each mass member to assume the characteristics of a body free in space which is constrained within the confines of the carrier associated therewith because of the centripetal force applied thereto partly by the applicable end wall of the carrier and partly by the associated spring 60 or 61, as the case may be. Each of the springs is a helical tension spring that imparts a variable force to the mass member with which it is connected in proportion to the extent to which the spring is stressed, all in accordance with Hooke's Law. Therefore, the more that each of the springs 60 and 61 is extended or stressed, the greater the magnitude of the force operative therethrough between the chassis 11 and the respectively associated mass members 54 and 55.

Being essentially bodies that are free in space, the mass members or weights 54 and 55 at any instant of time may be considered to be stationary bodies relative to the chassis 11, and in this sense serve as space anchors that cause the chassis 11 to be propelled forwardly with respect thereto because of the pulling force applied to the chassis from the mass members by the tension springs 60 and 61. This result is depicted in an oversimplified manner in FIG. 5 which illustrates the change in position of the center of rotation of each of the carriers relative to the mass member mounted therein as such carriers and mass members are rotatably driven through a complete 360° revolution. For purposes of specificity, the carrier 42 and mass member 54 will be considered in detail, it being recalled that the carrier 43 and mass member 55 mounted therein are counterrotating with respect to the carrier 42 and mass member 54 in mechanically enforced synchronism such that the forces attributable thereto are algebraically additive. Therefore, at certain predetermined intervals in such rotational motion, the various forces caused by rotation augment each other and at other intervals they cancel each other.

As concerns the theorized analysis, it may first be observed that the mass members 54 and 55 are homogeneous bodies essentially symmetrical about any axis therethrough, wherefore the center of gravity or center of mass of each such member is a close approximation to the geometric center thereof. Further, although the discussion is made with reference to the relative positions of the centers of the carrier 42 and mass member 54, it will be appreciated that the carrier 42 is rigid with the chassis 11 so that any change in position of the center of the carrier 42 is, therefore, a change in position of the ear 62 to which the spring 60 is attached and to the chassis 11 upon which the ear is mounted. In FIG. 5, the geometric center of the carrier 42 is illustrated by a small rectangle denoted with that numeral, the center of the mass member 54 is illustrated by a small dot or circle designated with the numeral 54, and the ear 62 and spring 60 are respectively depicted diagrammatically as origins and force vectors and are denoted with the numerals 62 and 60, respectively.

Referring to FIG. 5, it will be observed that the center of the rotating carrier 42 has a rectilinear motion advancing longitudinally along a straight line. The center of gravity 54 of the rotating mass member describes for the most part an arcuate path through a generally circular segment shown to be somewhat less than 180°, shifting its position quite rapidly in a diametral sense from one side of the axis of rotation of the carrier 42 to the opposite side thereof shortly after the center of gravity of the mass member traverses the rectilinear path of the carrier 42 and is substantially coincident with the center of the carrier.

More particularly, assume as the starting position of the center of the carrier 42 the position denoted in FIG. 5 with the letter *a*, and the corresponding starting position of the center of gravity of the mass member 54 being the position also denoted with the letter $a$, then the arcuate path described by the center of mass may be taken to be the path 66. These relative positions of the carrier 42 and mass member 54 correspond generally to the positions thereof shown in FIG. 1, at which time the mass member 54 is in abutment with the end wall 49 of the carrier. As the carrier and mass member continue to rotate in the counterclockwise direction illustrated, centrifugal force urges the mass member into tight abutment with the end wall 49 of the carrier and maintains such abutment for an angular distance somewhat less than 180°. At position $a$ of the mass member 54, the force developed through the spring 60 is somewhat minimal, as represented by the force vector $a$. As the mass member 54 is angularly displaced through position $a_1$ and $a_2$, essentially no change occurs in the position of the center of the carrier 42, and the tensile force developed in the spring 60 increases slightly as it is stressed, but since such increase has no appreciable effect, the change thereof is not shown in FIG. 5.

As the carrier 42 continues to rotate and passes the X axis (assuming the usual X – Y Cartesian coordinate system), the center of gravity of the weight 54 advances progressively through the positions respectively denoted with the letters $b$, $c$, and $d$, and the spring 60 is progressively stressed to a greater extent as indicated by the vectors $b$, $c$, and $d$. As previously indicated, the mass member 54 may be considered a body free in space, and as the spring force is progressively increased, the pulling force applied thereby to the ear 62 and chassis 11 increases until it is of sufficient magnitude to overcome the inertia of the apparatus so as to impart forward motion thereto. The precise instant at which forward motion is imparted to the carrier 42 and chassis 11 may vary considerably depending upon various parameters (such as friction, weight of the apparatus, etc.), but in the illustration of FIG. 5 it is assumed that forward motion is initiated at about the time that the center of gravity of the mass member 54 is in position $b$. Accordingly, the center of the carrier 42 is shown to have advanced into position $b$ at the time that the mass member 54 is in position $b$, and thereafter advances into positions $c$ and $d$ as the mass member respectively moves into positions $c$ and $d$.

In the diagrammatic illustration being considered, the center of the carrier 42 has overtaken the center of gravity of the mass member 54 at about the time that the center of gravity traverses the Y axis of the aforementioned coordinate system, and this coincident position of the centers 42 and 54 is denoted with the letter $e$. Accordingly, the center of the carrier 42 has advanced linearly from position $a$ to position $e$ as the center of gravity of the mass member 54 has traversed the arcuate path through the fourth and first quadrants of the coordinate system. At this time, then, the mass member 54 may be considered to be moving relative to the carrier 42 toward the opposite end thereof under the influence of various force terms including the tensile force imparted thereto by the spring 60, and such relative movement continues through the path 67 until the mass member is in abutment with the end 50 of the carrier 42 at which time the center of gravity of the mass member is in the position depicted at $f$. The described motion of the centers of the mass member 54 and carrier 42 is then repeated with the mass member progressively advancing through positions $f_1$ and $f_2$ into position $g$ and then through positions $h$, $i$, and $j$, which respectively correspond to the aforementioned positions $a_1$, $a_2$, $b$, $c$, $d$, and $e$. At the same time, the center of the carrier 42 (i.e., the axis of rotation defined by the axle 27 thereof) has advanced along the linear path through the positions $g$, $h$, $i$, and $j$ therealong.

FIG. 5 makes it evident the same action pertains with respect to the carrier 43, mass member 55, and spring 61, and assuming the same X – Y coordinate system, the algebraic addition of the propelling forces developed as the center of gravity of the mass member 54 passes through the first quadrant of the path 66 and the concurrently developed forces attributable to the center of gravity of the mass member 55 passing through the second quadrant augment or supplement each other, thereby propelling the apparatus forwardly. The propelling force is oriented along the Y axis, thereby causing the apparatus to move forwardly, but the forces providing the unidirectional propelling force also have transverse components which act along the X axis. However, these forces act in opposite directions as between the mass members 54 and 55 and, consequently, cancel each other so that there is essentially no tendency for the apparatus to be displaced transversely. As the centers of gravity of the mass members 54 and 55 pass through the fourth and third quadrant, respectively, the force components oriented along the X axis cancel each other, and those components oriented along the Y axis are of insufficient magnitude to materially influence movement of the apparatus 10. Accordingly, a unidirectional propulsion or movement is imparted to the apparatus 10 by the rotatably driven mass members 54 and 55 in operative association with the springs 60 and 61.

In one particular embodiment of the invention constructed in accordance with the apparatus illustrated in the drawing, the length of the chassis 11 approximates 3 ½ feet and the width thereof is about 2 feet. Each of the carriers 42 and 43 has a length of about 22 inches, and the mass members 54 and 55 are each about 18 inches long and weigh approximately 7 ½ lb. apiece. In such embodiment of the invention, the prime mover 21 is a one-third horsepower AC motor that drives the shafts 27 and 28 at about 150 RPM. In such particular embodiment of the invention, forward motion thereof is discontinuous or interrupted in the sense that it consists of short cyclically repetitive advances occurring at the rate of about 300 times per minute (i.e., one impulse for each 180° angular displacement of the mass members). The addition of rotating masses to such apparatus can smooth such motion by imparting propelling impulses to the apparatus in an out-of-phase relationship with the mass members 54 and 55.

Although tension springs 60 and 61 are used to couple the mass members with the chassis, other mechanisms can be used for this purpose including mechanically actuated and fluid energized mechanisms such as the hydraulic system disclosed in my aforementioned application Ser. No. 813,529. Further, the carriers and mass members can be disposed for movement about horizontal axes rather than vertical axes, also as disclosed in such prior application.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. Propulsion apparatus of the character described, comprising a chassis adapted to be propelled in one predominant linear direction, a mass member operatively supported by said chassis for rotation with respect thereto about a predetermined axis and being radially displaceable relative to said axis under the influence of centrifugal force developed by said mass member upon rotation thereof, means coactive with said mass member for limiting the extreme radial positions thereof, a prime mover carried by said chassis and being drivingly connected with said mass member for rotating the same about said axis, and coupling means interconnecting said mass member and chassis to develop therebetween during a predetermined segment in the rotational motion of said mass member a force superior in magnitude to the centrifugal force developed thereby to displace said mass member bodily thereagainst through said axis of rotation and relative to said chassis and thereby effect a corresponding change in the relative positions of said chassis and mass member with the result that said chassis is advanced in such one predominant linear direction in consequence of the cyclically repetitive rotational and bodily displacements of said mass member.

2. The propulsion apparatus of claim 1 in which said chassis is equipped with wheels adapted to rollingly engage a support surface therefor along which said chassis is propelled in the aforementioned one predominant linear direction.

3. The propulsion apparatus of claim 1 in which said mass member is supported for rotation about a generally vertical axis, and in which the center of gravity of said mass member is shifted through said axis of rotation during the aforesaid change in the relative positions of said mass member and chassis.

4. The propulsion apparatus of claim 1 in which said means coactive with said mass member for limiting the extreme radial positions thereof includes a carrier supported adjacent its geometric center for rotation about said predetermined axis and being connected with said prime mover so as to be driven thereby, said mass member being slidably supported by said carrier for the aforesaid radial and bodily displacements.

5. The propulsion apparatus of claim 4 in which said coupling means are operative to displace said mass member radially in an inward direction along said carrier and to initiate such inward displacement in the angular quadrant defined between a coordinate axis established by such linear direction and a complementary coordinate axis generally normal thereto through the axis of rotation of said mass member as the mass member is rotated through such quadrant toward the axis established by such linear direction, whereby the reduction in the angular velocity of said mass member incident to the inward displacement thereof imparts an additional force to said chassis through said carrier and axis of rotation thereof contributive to the propulsion of the chassis in such predetermined direction.

6. The propulsion apparatus of claim 1 in which said coupling means interconnecting said mass member and chassis includes a tension spring connected therebetween.

7. The propulsion apparatus of claim 1 in which said mass member includes a plurality of individual mass members each supported by said chassis for rotation with respect thereto and arranged in counterrotative pairs, each being radially displaceable, limited by the aforesaid coactive means, driven by said prime mover, and connected with said chassis by said coupling means for bodily displacements all as aforesaid.

8. The propulsion apparatus of claim 7 in which said coupling means is effective to change the position of each of said mass members and chassis such that said predetermined segments through which such relative displacement occurs is generally parallel to the predominant linear direction in which said chassis is advanced and precedes the crossing of such linear direction by the mass member in its rotational path of movement.

9. The propulsion apparatus of claim 8 in which, with respect to each of said individual mass members, said means coactive therewith for limiting the extreme radial positions thereof includes a carrier supported adjacent its geometric center for rotation about said predetermined axis and being connected with said prime mover so as to be driven thereby, said mass member being slidably supported by said carrier for the aforesaid radial and bodily displacements.

10. The propulsion apparatus of claim 9 in which said chassis is equipped with wheels adapted to rollingly engage a support surface therefor along which said chassis is propelled in the aforementioned one predominant linear direction, each of said mass members being supported for rotation about a generally vertical axis, and the center of gravity of each of said mass members being shifted through the associated axis of rotation during the aforesaid change in the relative positions of said mass members and chassis, and in which said coupling means interconnecting each mass member and chassis includes a tension spring connected therebetween.

* * * * *